Patented Dec. 29, 1925.

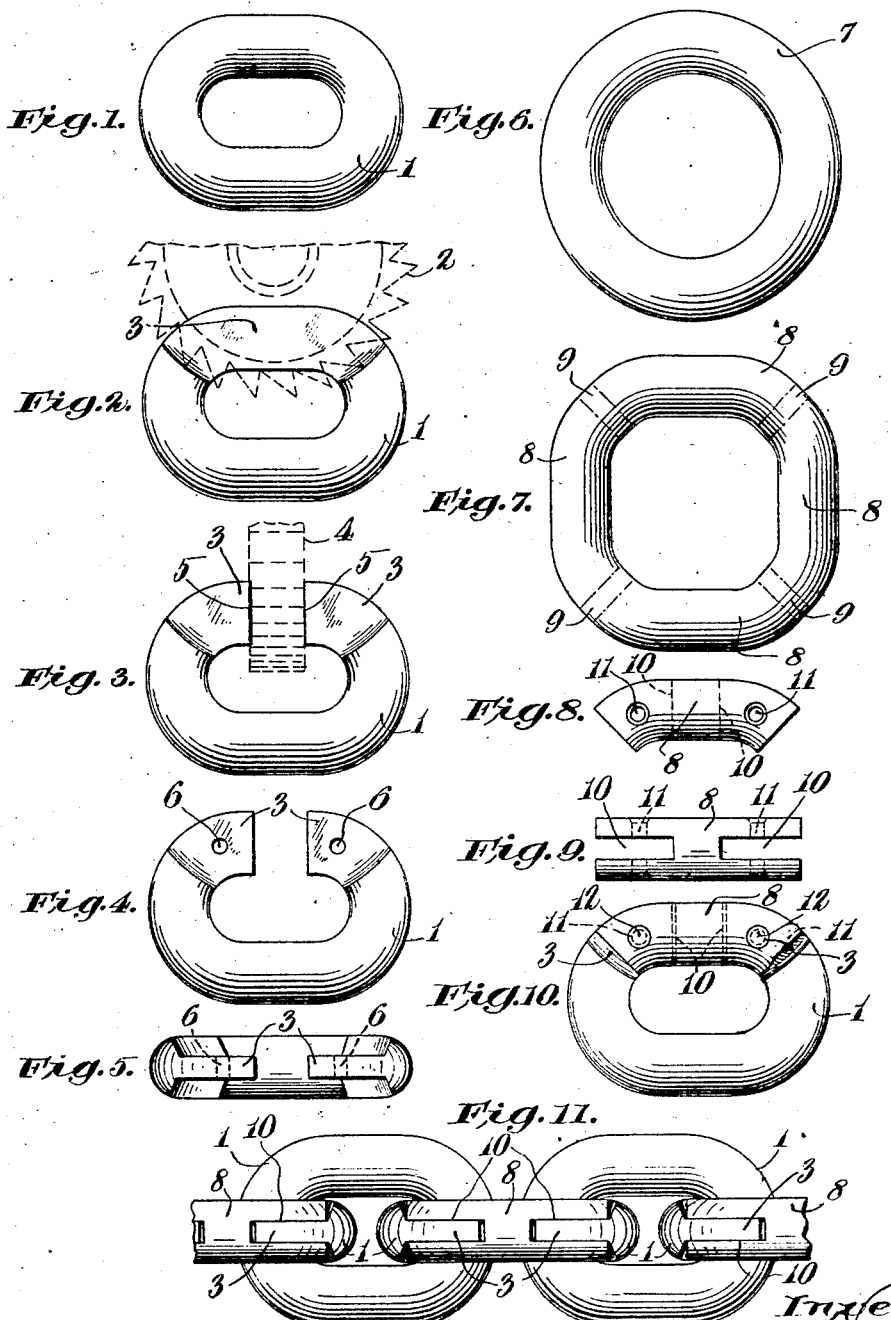

1,567,505

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

METHOD OF MAKING CHAINS.

Application filed December 15, 1919. Serial No. 344,947.

*To all whom it may concern:*

Be it known that I, MORRIS P. HOLMES, a citizen of the United States, residing at Claremont, in the county of Sullivan and State of New Hampshire, have invented certain new and useful Improvements in Methods of Making Chains, of which the following is a full, clear, and exact specification.

My invention relates to methods of making chains.

It has for its object to provide an improved method of making chains whereby the cost of manufacture is materially reduced at the same time that the product is improved. More specifically, my invention has for its object to improve and simplify the methods of manufacturing sectional chains, and more especially heavy duty chains, whereby such chains may be produced in an improved manner enabling an improved and stronger product to be produced from better materials at a modest expense.

In the accompanying drawings I have shown, for purposes of illustration, the different steps involved in one embodiment of my invention.

In these drawings,—

Fig. 1 is a side elevation of a body blank.

Fig. 2 is a similar view showing the same during the longitudinal milling operation.

Fig. 3 is a similar view showing the same after the longitudinal milling operation and during the transverse milling operation.

Fig. 4 is a similar view showing the completed body blank after transverse boring.

Fig. 5 is a plan view of the same.

Fig. 6 is a side elevation of a removable section blank.

Fig. 7 is a similar view of the same after polygonal shaping and preparatory to cutting.

Fig. 8 is a side elevation of a single completed removable section after milling and boring its ends.

Fig. 9 is a plan view of the same.

Fig. 10 is a side elevation of a complete link.

Fig. 11 is a plan view of a section of assembled chain.

In my improved method of manufacturing the sectional links, I preferably employ two different blanks, one for the body of the link and the other for the removable sections, operating independently upon these blanks to produce the different parts of the link, and then uniting the parts to form the completed link.

The so-called body blank 1 is illustrated in Fig. 1 and is preferably of the conventional link form and cross section, the same preferably being made into that form in accordance with the invention of Omer J. Dansereau, application filed December 15, 1919, Ser. No. 345,827. The first step in operating upon this blank is to mill one side of it longitudinally, as shown in Fig. 2, the same preferably being operated upon by a laterally moving milling cutter 2 to form a longitudinal rib 3, the material on each side of the rib being cut away as shown in Fig. 5. The next step in the method includes the transverse milling, a milling cutter 4 being fed into the rib 3 in such a manner as to cut out the center section between the lines 5, 5, Fig. 3, and thereby transform the rib 3 into oppositely extending, longitudinally spaced tongues. The next step in the method of manufacture of the body members preferably includes the insertion of transverse bores 6 in each of the tongues, whereupon the body portion of a link is complete and ready for assembling, although obviously the boring may be delayed, as later described.

In forming the removable sections, a blank 7 is used of greater diameter than the blank used for the body portion but of the same cross section as the blank 1, the size of the blank 7 being determined by the curvature of the removable sections desired and the number of the same to be cut from the blank. This blank 7 is then also bent, the same, however, not being flattened as in the case of the blank 1, but instead being bent into generally polygonal form, herein into approximately rectangular form, as shown in Fig. 7. After this step, the blank is then divided into sections 8, as by cutting the same at the points 9 indicated on Fig. 7. Thereafter, each of the sections 8 has its opposite ends grooved, as at 10, and bored transversely, as at 11, thereby completing the manufacture of the removable section 8.

To form a complete link, a section 8 is fitted upon a body section 1 with its grooves 10 receiving the tongues 3 on the body section, and the two sections are then united by driving pins 12 through the registering bores 6, 11, where the parts have been previously bored, or by boring the holes and driving the pins therein in successive operations, as may seem best suited to the circumstances during manufacture. In assembling a complete chain in accordance with my improved method, I also preferably, as shown in Fig. 11, utilize blanks of the same shape as the body blanks 1, as solid links disposed alternately between sectional links of my improved construction before assembly of the latter. Further, in my improved method, I make these solid and sectional links of materials of different tensile strength, for example, using a carbon steel for the stronger solid links and an alloy steel for the sectional links. Obviously, without departing from my invention, different materials may be used to meet different requirements, and in the particular combination disclosed, the carbon steel may be of different carbon content depending upon the tensile strength required, while the alloy steel may be of high tensile strength, such as chrome nickel, for heavy duty purposes, or of less tensile strength when such strength is not required. To give even further strength, the solid and sectional links are also preferably heat treated before assembly. The object of this heat treating is to remove strains and also to improve physical qualities. One form of heat treatment which has been found beneficial in practice consists in heating the solid links after the forging has been completed to above the critical temperature and then cooling them slowly to remove strains. The sectional links may be heated above critical temperature and quenched in a suitable bath and then when their temperature has been reduced to atmospheric they may be reheated to various temperatures less than the critical temperature of the metal of which they are composed and cooled slowly, thereby improving the physical properties such as tensile strength, resistance to shock etc.

As a result of my improvement, it will be observed that it is possible to form a link entirely by machining, and without the necessity for any forging whatsoever, thereby enabling complete links to be formed of better materials adapted to machining but not adapted to forging. It will also be evident that by my improved method it is possible to produce a link expeditiously and at small expense, the several operations being simple and of a character adapted to be performed by relatively unskilled operatives. By reason of the use of blanks of the same shape for both solid and sectional links, the cost of manufacture of the complete chain is also materially reduced. Further, due to the use of blanks of different materials, an exceptionally strong chain of uniform strength is produced. These and other advantages of my improved construction will, however, be clearly apparent to those skilled in the art.

While I have in this application specifically described one form which my invention may assume in practice, it will be understood that this form of the same is shown for purposes of illustration, and that the invention may be modified and embodied in other forms without departing from its spirit or the scope of the appended claims.

What I claim as new and desire to secure by Letters Patent is:

1. The method of making body sections for sectional chain links which consists in milling longitudinally and transversely one side of a solid body section to form longitudinally disposed oppositely extending tongues.

2. The method of making a sectional chain link which consists in, milling longitudinally spaced tongues on one side of a solid body blank, milling corresponding grooves in the ends of a removable section blank, bringing the parts into fitting relation, and passing pins transversely through said tongue and groove joints.

3. The method of making body sections for sectional chain links which consists in, milling a longitudinal rib on one side of a solid body section by removing the metal at each side of said rib, and then milling out the center of said rib transversely to form longitudinally disposed, oppositely extending tongues.

4. The method of making removable sections for sectional chain links which consists in, forming a generally polygonal removable section blank, cutting the same at each of the vertices of the polygon to form a number of sections equal to the number of sides of the polygon, and finishing the ends of each section.

5. The method of making removable sections for sectional chain links which consists in, forming a polygonal removable section blank, cutting the same at each vertex of the polygon to form a number of sections equal to the number of sides of the polygon, and slotting the ends of each section.

6. The method of making a sectional chain link which consists in, milling longitudinally disposed reduced ends in one side of the body blank, shaping a larger blank into polygonal form, cutting the polygonal blank into sections each comprising substantially one face of the polygon, forming the ends of a section to complement the ends of the body blank, interfitting said ends, and pinning the same together.

7. The method of making a sectional chain link which consists in, milling longitudinally disposed and spaced tongues in one side of a solid body blank, shaping a larger blank into polygonal form, cutting the polygonal blank into sections each comprising substantially one face of the polygon, slotting the ends of each section, fitting the same over said tongues, and passing pins transversely through said slotted ends and tongues.

In testimony whereof I affix my signature.

MORRIS P. HOLMES.